United States Patent
Eck

(10) Patent No.: US 9,216,888 B2
(45) Date of Patent: Dec. 22, 2015

(54) ASSEMBLY FOR DISPENSING A CANISTER'S LIQUID CONTENTS INTO A VESSEL AND FOR RINSING A RESIDUE OF THE LIQUID CONTENTS

(71) Applicant: Ethan Eck, Kingman, KS (US)

(72) Inventor: Ethan Eck, Kingman, KS (US)

(*) Notice: Subject to any disclaimer, the term of this patent is extended or adjusted under 35 U.S.C. 154(b) by 293 days.

(21) Appl. No.: 13/928,344

(22) Filed: Jun. 26, 2013

(65) Prior Publication Data

US 2014/0090749 A1     Apr. 3, 2014

(51) Int. Cl.
| | |
|---|---|
| *B08B 9/093* | (2006.01) |
| *B67D 3/00* | (2006.01) |
| *B08B 9/08* | (2006.01) |
| *A01M 7/00* | (2006.01) |

(52) U.S. Cl.
CPC ........... *B67D 3/0061* (2013.01); *A01M 7/0085* (2013.01); *B08B 9/0826* (2013.01); *B08B 9/093* (2013.01)

(58) Field of Classification Search
CPC .............................. B08B 9/0826; B08B 9/093
USPC ....................... 141/89, 90, 329, 330
See application file for complete search history.

(56) References Cited

U.S. PATENT DOCUMENTS

| | | | | |
|---|---|---|---|---|
| 2,002,611 | A | * | 5/1935 | Nall ............................... 141/330 |
| 2,806,635 | A | * | 9/1957 | Kader et al. ..................... 222/88 |
| 4,058,412 | A | * | 11/1977 | Knapp et al. ..................... 134/24 |
| 4,628,972 | A | * | 12/1986 | LaRochelle ..................... 141/91 |
| 4,702,267 | A | | 10/1987 | Ashraff |
| 4,846,236 | A | | 7/1989 | Deruntz |
| 5,174,828 | A | | 12/1992 | Roth |
| 5,271,437 | A | * | 12/1993 | O'Brien et al. ................. 141/51 |
| 5,497,813 | A | | 3/1996 | Dinnis et al. |
| 5,781,868 | A | | 7/1998 | Miller et al. |
| 5,865,343 | A | * | 2/1999 | Busch et al. ...................... 222/1 |
| 6,293,318 | B1 | * | 9/2001 | Schmidt et al. ............... 141/330 |

OTHER PUBLICATIONS

Focus Industries, Inc.; Handler I, II, & III Operators Manual; Oct. 2008; Relevant portion: Parts Breakdown, p. 42; Published in U.S.

* cited by examiner

*Primary Examiner* — Nicolas A Arnett
(74) *Attorney, Agent, or Firm* — Kenneth H. Jack; Davis & Jack, L.L.C.

(57) ABSTRACT

An assembly for purging a canister into a tank and for rinsing the canister, the canister having a floor, the assembly including a "A" configured lance having a plurality of legs and a bar, each leg among the plurality of legs forming a blade having an upper end and an outer edge, the blades' upper ends and outer edges being sharpened for, upon upward impingement against the canisters' floor, dividing the floor into a plurality of sections, each section among the plurality of sections being configured as a flexible leaf, the bar member forming and functioning both as a leaf deflecting mandrel, and as a rotatable sprinkler head, the "A" configured lance and associated sprinkler head configured mandrel being mountable within the tank by suspension hooks.

3 Claims, 5 Drawing Sheets

ASSEMBLY FOR DISPENSING A CANISTER'S LIQUID CONTENTS INTO A VESSEL AND FOR RINSING A RESIDUE OF THE LIQUID CONTENTS

CLAIM OF PRIORITY FROM PREVIOUSLY FILED PROVISIONAL PATENT APPLICATION

This non-provisional patent application claims the benefit of and priority from U.S. Provisional Patent Application No. 61/725,134 filed Nov. 12, 2012, and entitled "Method and Apparatus for Chemical Media Transfer". The inventor and applicant named in said U.S. Provisional Patent Application No. 61/725,134 is one and same person as the inventor and applicant in the instant application. Structures and functions of structures disclosed and described in the instant application are substantially identical to those disclosed in said provisional application.

FIELD OF THE INVENTION

This invention relates to apparatus and assemblies which are adapted for transferring the liquid contents of herbicide, pesticide, or fertilizer canisters and bottles into larger vessels such as tanks of agricultural sprayers, and which are adapted for subsequently rinsing such canisters and bottles. More particularly, this invention relates to such apparatus and assemblies which include canister floor piercing and cutting means.

BACKGROUND OF THE INVENTION

Tank mounted apparatus for piercing and incising the floor of a herbicide, pesticide, or fertilizer canister and for quickly dispensing the contents of the canister into the tank are known. Such assemblies often allow incised edges of the canister's floor to directly abut or impinge against side surfaces of cutting blades, and such edge contacts often undesirably impede the downward emission and dispensation of the fluid into the tank. Such impingements of incised floor edges against cutting blade surfaces also undesirably tend to resist and interfere with subsequent upward and inward flows of residue rinsing water, and further interfere with downward flows of the rinsed residual herbicide, pesticide, or fertilizer.

The instant inventive assembly for dispensing a canister's liquid contents into a vessel and for water rinsing a residual of the liquid contents solves or ameliorates the above discussed problems and deficiencies by incorporating within the assembly a specially configured and specially functioning "A" lance having a bar component which is capable of functioning in the manner of a mandrel for canister floor section splaying, and immediately subsequently functioning as a canister rinser.

BRIEF SUMMARY OF THE INVENTION

The instant inventive assembly preferably functions and operates for dispensing a canister's liquid contents into a vessel. A canister upon which the assembly may typically be used comprises a herbicide, pesticide, or fertilizer container, and a type of vessel with which the assembly may be used may typically comprise a storage tank of an agricultural or commercial sprayer. Notwithstanding, the scope of the invention includes canisters and containers of other liquid chemicals and includes dispensation into other tanks and vessels.

In addition to the instant invention's chemical dispensing function, the inventive assembly preferably further operates for water rinsing of chemical residues such as herbicides, pesticides, or fertilizers which may be left within a canister after the greater volume of its contents are downwardly dispensed.

A first structural component of the instant inventive assembly preferably comprises an "A" lance which has a plurality of, and preferably either three or four legs. Like a commonly configured capital letter "A", the "A" lance includes a horizontally extending bar member which spans between the legs. Each leg among the "A" lance's plurality of legs preferably outwardly presents a sharpened blade. In the preferred embodiment, the legs' upper ends form a sharpened point or apex for canister floor piercing. Upon downwardly thrusting or driving a canister's floor against such sharpened point, a hole within the floor is formed, and upon further downward driving, the sharpened edges of the "A" lance's blade configured legs effectively incise and divide or segment the canister's floor into a plurality of flexible or bendable leaf sections. In a preferred embodiment, the canister floor's incision form a "+", "★", or "*" pattern of cuts.

A further structural component of the instant inventive assembly comprises rinsing means which are connected operatively to the "A" lance. In the preferred embodiment, the rinsing means are adapted for emitting rinsing water into the interior volume of a canister for rinsing therefrom chemical residue such as herbicide, pesticide, or fertilizer residues. The rinsing means are preferably adapted for emitting the rinsing water in the form of jets which extend from the "A" lance's bar component. Such rinsing means positioning advantageously enhances the water's rinsing effect upon complete downward thrusting of a canister over the pointed upper end of the "A" lance.

A further structural component of the instant inventive assembly comprises first mounting means which are preferably adapted for positioning the "A" lance within a vessel, and preferably immediately below the vessel's upper opening. Suitable first mounting means include suspension hooks, tank wall attaching plate mounts, and tank floor attaching base mounts.

In operation of the instant inventive assembly, and upon utilization of the first mounting means for positioning the "A" lance component at and below a vessel's upper opening, an operator may initially hold a liquid chemical canister above the vessel's upper opening. Thereafter, the operator may move the canister downwardly into and through the vessel's upper opening and directly against the pointed apex of the assembly's "A" lance. Thereafter, the operator may continue to press the canister downwardly against such point, causing the point and the "A" lance's radially extending leg configured blades to pierce and incise upwardly through the canister's floor. Upon such piercing and incising action, the liquid chemical contents of the canister begins to dispense downwardly between the edges of the incision and the sides of the blade configured legs.

Such downward driving of the canister against the "A" lance preferably continues until the canister's floor resides at an elevation below the "A" lance's bar component. Thereafter, and following substantially complete dispensation of the canister's contents, the assembly's rinsing means may be actuated. Provided that the "A" lance's bar is channeled and ported to emit jets of water, the bore position above the canister's floor allows the water jets to efficiently rinse the walls and floor of the canister. The rinsed chemical residue simultaneously purges downwardly through the incised floor of the canister.

In a preferred embodiment of the instant assembly, the "A" lance's bar component is configured to further function as an enlarged leaf deflecting or splaying mandrel. Upon the above described downward thrusting of the canister against the "A" lance, impingement of such mandrel configured "A" bar advantageously upwardly splays the floor's incised leaf sections, such splaying hastening the progress of downward purging of fluid into the vessel. The mandrel configured "A" lance bar is preferably adapted to function as a sprinkler head, and further preferably as a rotatable sprinkler head. Thus, the invention's specially configured "A" bar functions automatically and sequentially for enhanced chemical dispensing through mandrel splaying of floor leaves and for enhanced canister rinsing through rotary sprinkler head action.

Accordingly, objects of the instant invention include the provision of an assembly for dispensing a canister's liquid contents into a vessel, and for water rinsing of a residual of the liquid contents which incorporate structures as described above, and which arranges those structures in relation to each other in manners described above, for the achievement of the benefits and advantages described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
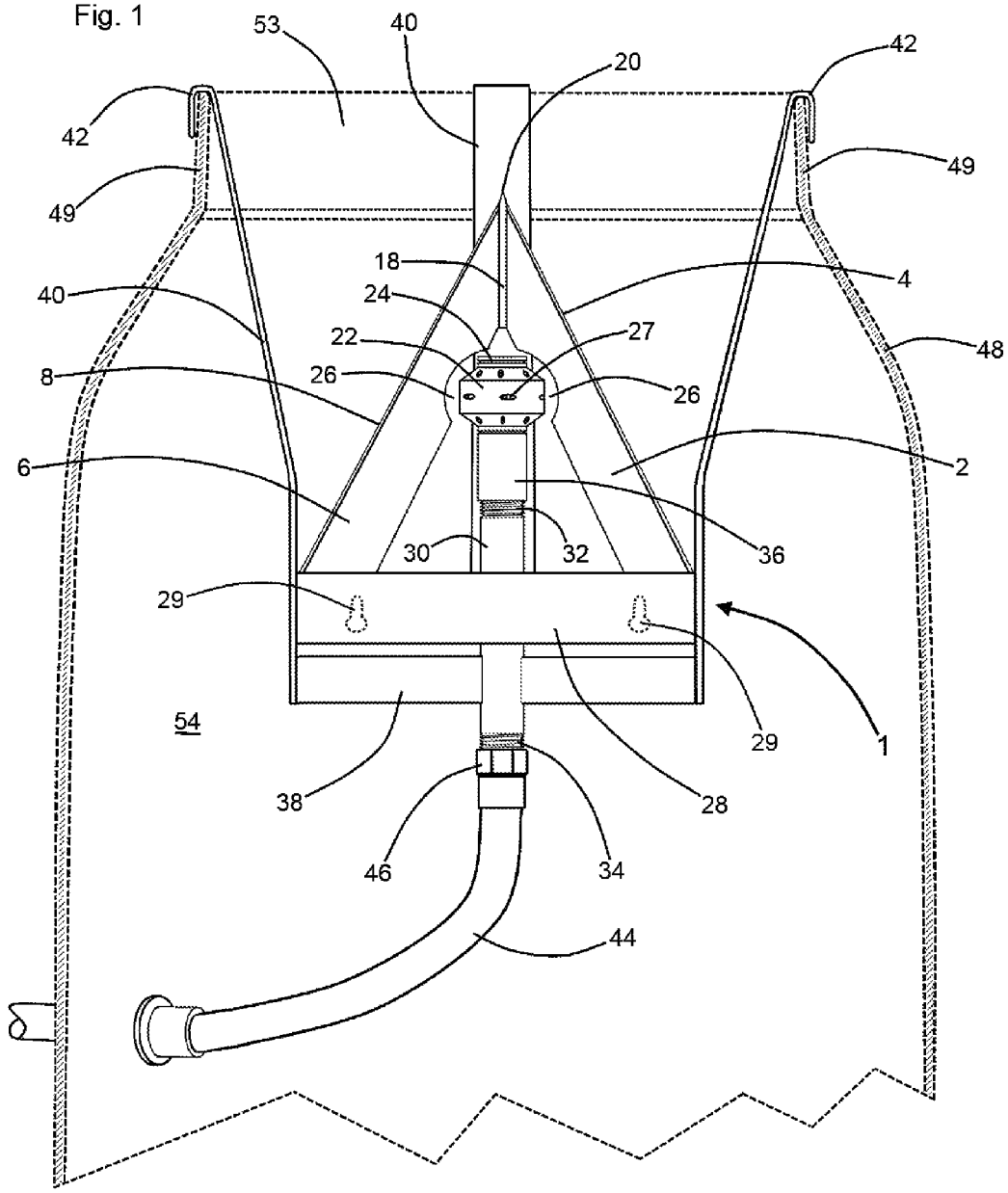
FIG. 1 is a side view of the instant inventive assembly, the view showing the assembly installed upon a chemical tank or vessel.
Figure 2:
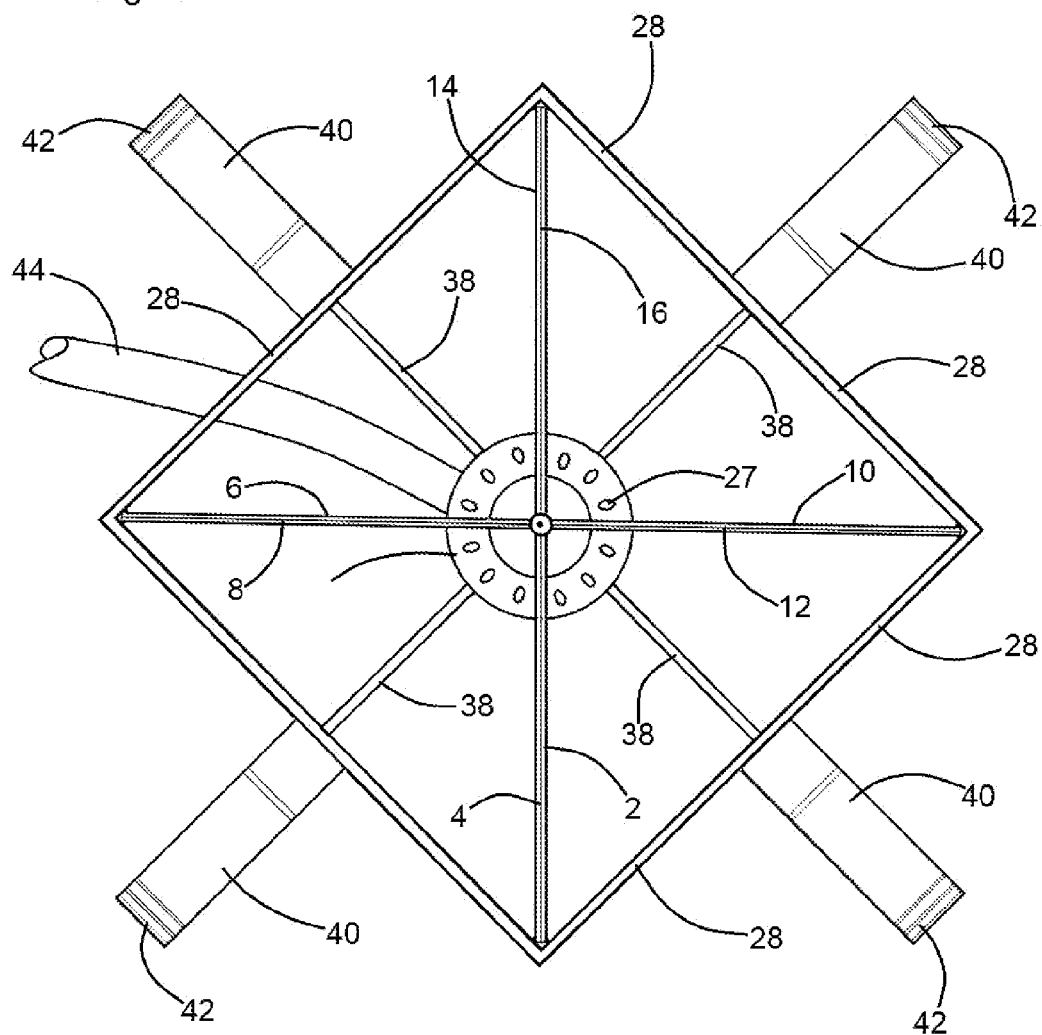
FIG. 2 is an upper view of the assembly of FIG. 1.

Referring now to the drawings and in particular simultaneously to FIGS. 1 and 2, an "A" lance component of the instant inventive assembly is referred to generally by Reference Arrow 1. Like the structure of a common capital letter "A", the instant invention's "A" lance 1 preferably has a plurality of legs 2, 6, 10 and 14. The "A" lance's legs 2, 6, 10, and 14 are configured as blades which respectively have outer sharpened edges 4, 8, 12, and 16. The upper ends of the "A" lance's legs 2, 6, 10, and 14 are preferably fixedly welded to a steel bar stock member 18, and such legs 4, 6, 10, and 14 in combination with the upper end of bar stock 18, form a canister floor piercing point 20.

Referring further simultaneously to FIGS. 1 and 2, the instant invention's "AA" lance further includes a bar member 22,26 which spans laterally between legs 2, 6, 10, and 14, the bar member 22,26 corresponding with the horizontally extending cross bar component of a common capital letter "A". While the instant invention's bar member may suitably comprise a solid cross arm structure which rigidly spans between inner aspects of the legs 2, 6, 10, and 14, the instant invention's bar member preferably comprises a combination of an enlarged mandrel 22 and radial series of sprinkler head clearance gaps 26. Each clearance gap component 26 of the "A" lance's bar is functionally positioned between the lateral edges or outer surfaces of the mandrel 22 and inner aspects of the legs 2, 6, 10, and 14.

Referring further simultaneously to FIGS. 1 and 2, a rigid box configured frame 28 preferably spans between and rigidly interconnects the lower ends of the "A" lance's legs 2, 6, 10, and 14. Where the invention's "A" lance component includes four legs, as is depicted in FIGS. 1 and 2, the rigid frame member 28 is preferably square in shape. The "A" lance component may suitably alternatively present a fewer or greater number of legs, and upon such alternate configurations the frame member 28 may be correspondingly geometrically shaped. Suitably, the rigid frame 28 may alternatively be circular.

Referring further to FIGS. 1 and 2, the instant inventive assembly preferably further comprises first mounting means which are adapted for positioning the "A" lance 1 at the interior 54 of a chemical tank or vessel such as tank 48. Tank 48 is typically constitutes a component of an agricultural or commercial chemical sprayer (not shown within views). Tank 48 has a large upper opening 53 which is peripherally defined by a lip 49. The invention's first mounting means may suitably comprise the depicted series of suspension ties 40 whose upper ends 42 are adapted for hooking engagements with the lip 49 of the tank 48. Other means for mounting the "A" lance 1 at the interior 54 of a tank such as tank 48 may be suitably substituted for the depicted suspension hooks 40, such suitable alternate mounting means including bolt receiving apertures 29 (shown in dashed lines) or some other commonly known structural mounting means.

Figure 6:
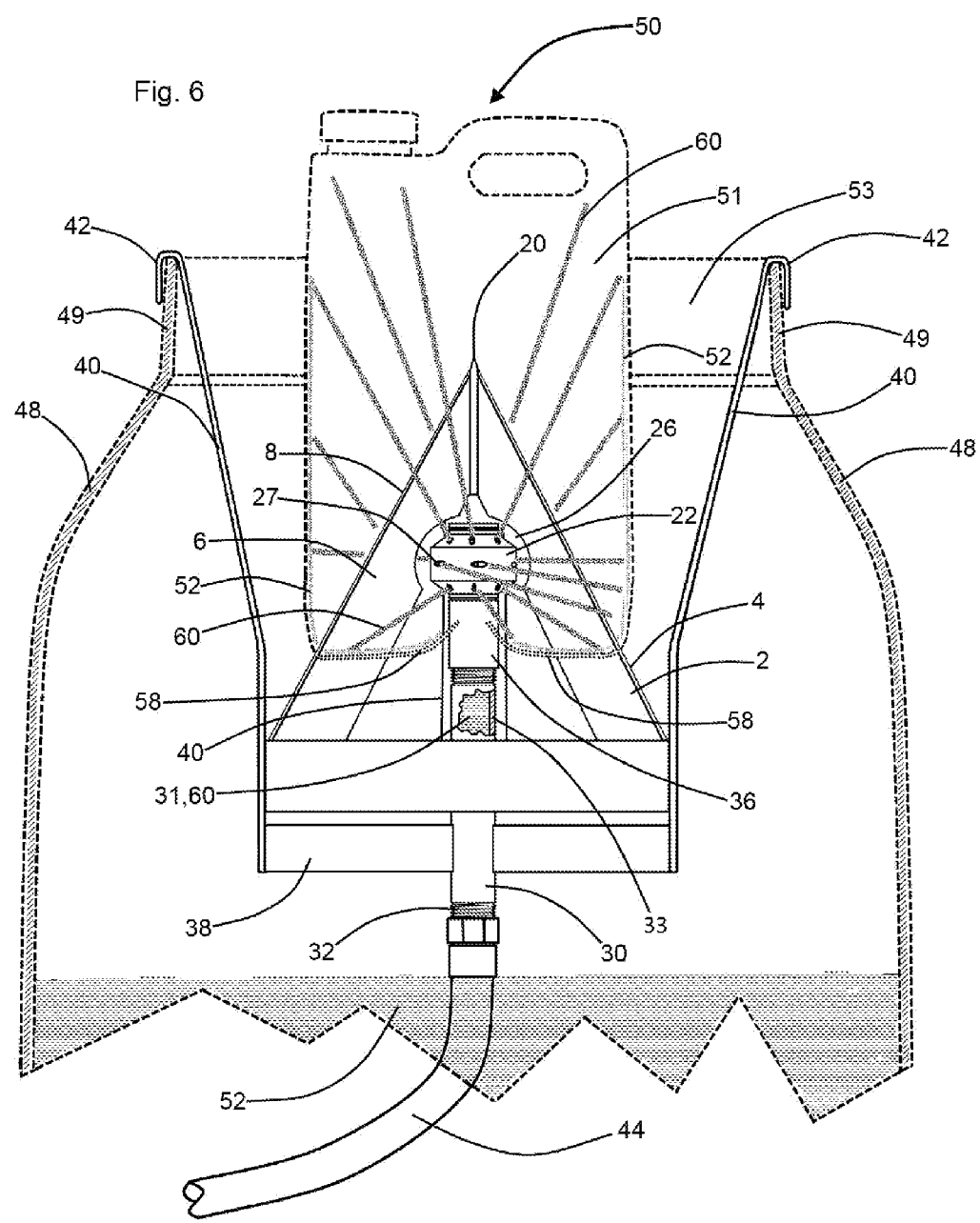
FIG. 6 redepicts the structure of FIGS. 4 and 5, the view of FIG. 6 showing the canister further downwardly driven, and showing operation of the instant invention's rinsing means.

Referring simultaneously to FIGS. 1, 2, and 6, rinsing means are preferably connected operatively to "A" lance 1, the rinsing means being adapted for emitting rinsing water 60 from the elevation and location of the "A" lance's bar 22,26. Such rinsing means preferably configure the mandrel 22 as a sprinkler head and comprise rotary bearings 24 which allow jets of the water 60 emanating from ports 27 to rotate the mandrel/sprinkler head 22.

Referring to FIG. 1, the functional mandrel character of the sprinkler head 22 preferably comprises a fixedly attached column member which extends downwardly from the sprinkler head 22, such column member preferably comprising a tubular coupling member 36, and an interconnected pipe section 30 having upper and lower helical threads 32 and 34.

Second mounting means, preferably in the form of brace members 28, rigidly span between the lower end of the "A" lance and the side wall of the pipe section 30. Other common structural means and connections for fixedly positioning the sprinkler head beneath and between the "A" lance's legs are considered to fall within the scope of the invention.

As indicated in FIG. 6, the instant invention's rinsing means preferably comprise a hollow water conveying bore 31 which is cylindrically defined by the annular wall 33 of the columnar pipe section 30. Referring further to FIG. 1, the rinsing means preferably further comprise a water supply tube 44 which is fixedly attached to the lower helical threads 34 of pipe section 30 via a helically threaded rotatable coupling nut 46.

Figure 3:
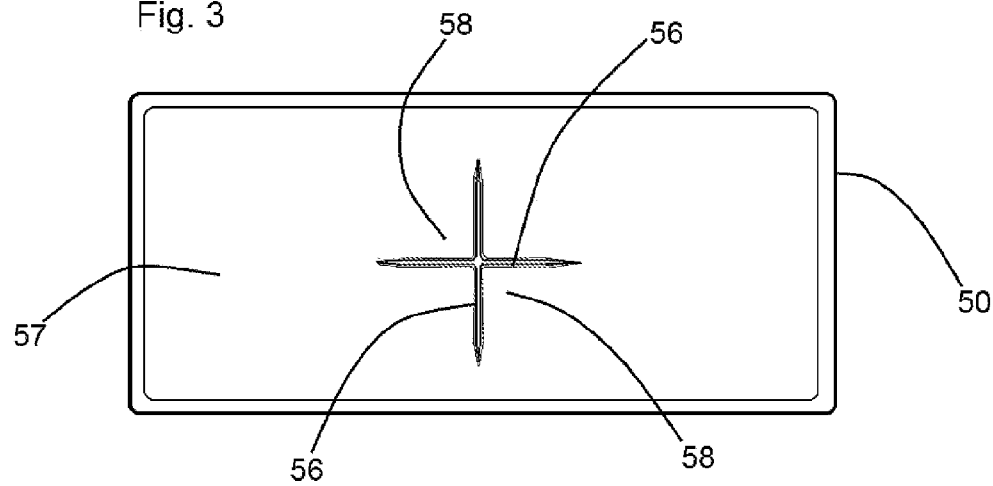
FIG. 3 is a bottom view of a chemical canister whose floor has been incised by the instant inventive assembly.

In use of the inventive assembly, and referring in particular to Drawing FIG. 1, an operator may initially install the "A" lance assembly 1 within the interior 54 of an exemplary agricultural spray tank 48, in the manner depicted in FIG. 1. Thereafter, referring further to FIG. 4, the operator may grasp a canister 50 filled with a liquid chemical 52 such as a herbicide, a pesticide, or liquid fertilizer, and may move the canister 50 downwardly toward and into the upper opening 53 of the tank 48. Such downward motion initially causes the point 20 of the "A" lance to contact the floor 57 of the canister 50, puncturing the canister's floor and creating canister floor incisions 56. Referring further simultaneously to FIG. 3, "+" incisions 56 through the canister floor 57 result from the canister/"A" lance engagement depicted in FIG. 4. Upon such incising engagement of the "A" lance with the canister 50, the fluid chemical 52 typically begins to emit downwardly from the canister 50 into the interior 54 of the tank 48. However, at such point such fluid dispensation is often undesirably hindered by sealing contacts between the incised edges of canister's newly created floor leaf sections 58 and the side surfaces of blades 2, 6, 10, and 14.

Figure 4:
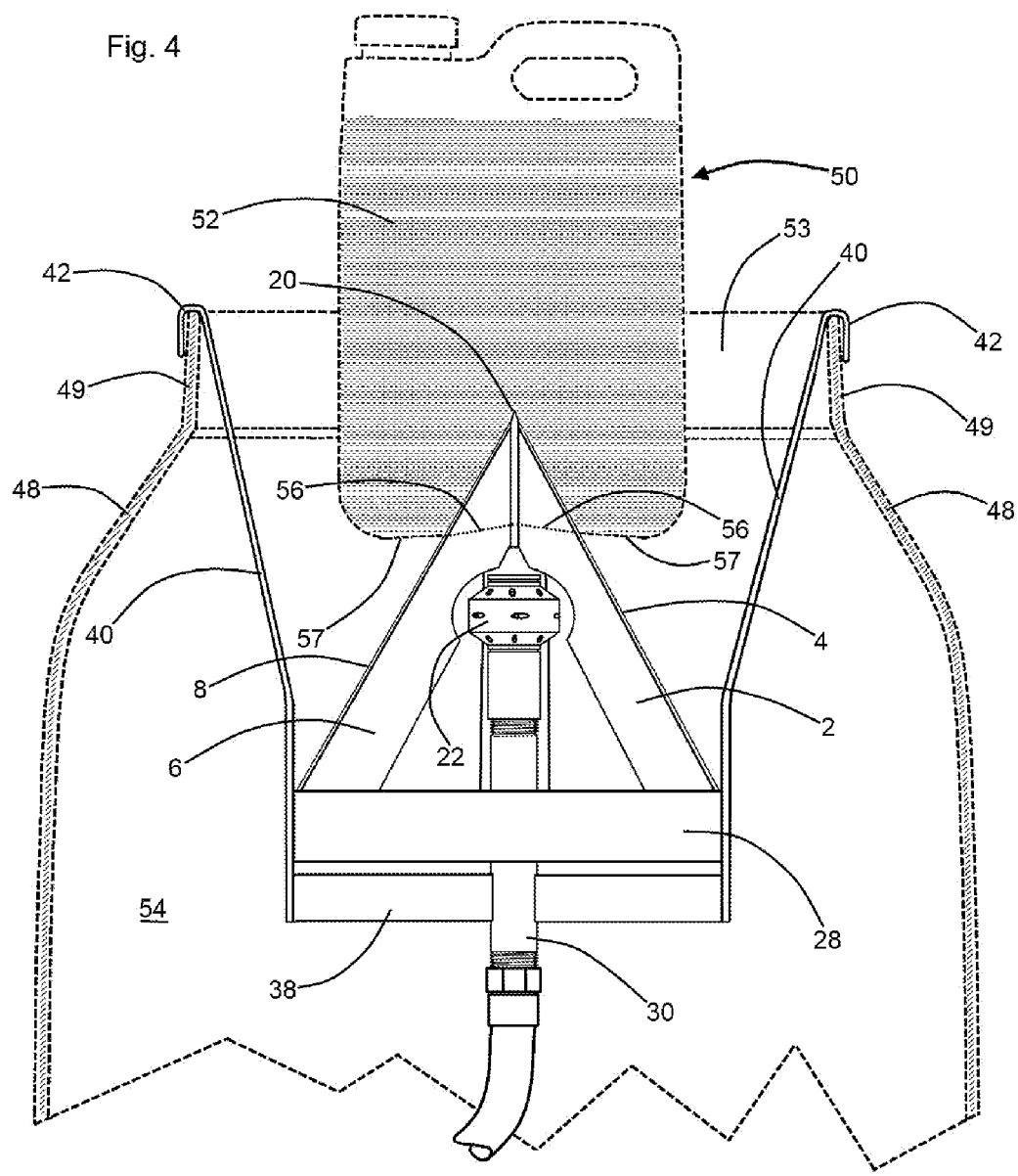
FIG. 4 redepicts the structure of FIG. 1, the view of FIG. 3 showing a chemical canister driven downwardly in engagement with the assembly.
Figure 5:
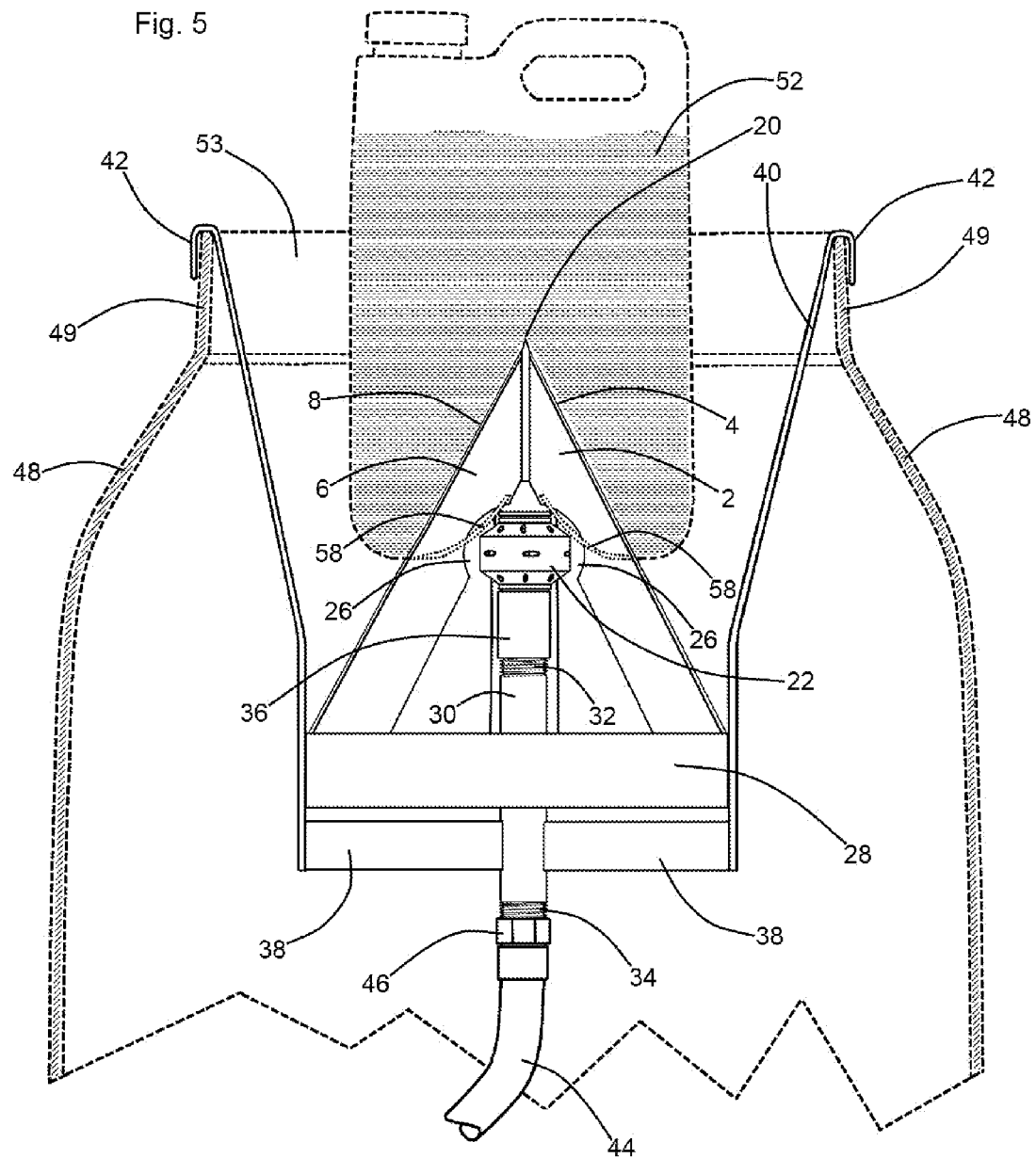
FIG. 5 redepicts the structure of FIG. 4, the view of FIG. 5 showing the canister further downwardly driven.

Referring simultaneously to FIGS. 3, 4, and 5, the operator may progressively downwardly drive the canister 50 against the "A" lance from the position depicted in FIG. 4 to the position depicted in FIG. 5. Upon such further downward driving of the canister, incisions 56 are lengthened while the lower surfaces of leaf sections 58 come into contact with upper surfaces of the assembly's mandrel/sprinkler head 22. The mandrel action of sprinkler head 22 against leaf sections 58 advantageously upwardly and laterally outwardly splays the leaf sections 58, advantageously widening the gaps between the edges of the incisions 56. Such incision splaying and floor gap widening advantageously hastens dispensation of the chemical contents of the canister 50 into the tank 48.

Referring simultaneously to all figures, the operator may suitably upwardly withdraw the canister 50 from FIG. 5 position after substantially complete downward dispensing of liquid chemical 52. However, as shown in FIG. 6, a residue of the chemical 52 often continues to reside at and adhere to the interior walls of the canister 50. In many instances, the operator is required by Federal EPA regulations to rinse such residue 52 from the canister's interior walls prior to disposal of the canister. Separately performing canister rinsing steps is often cumbersome and time consuming.

Instead of upwardly withdrawing the canister 50 from the FIG. 5 position, the operator may advantageously continue to downwardly drive the canister 50 against the "A" lance, such continued driving moving the canister from the FIG. 5 position to the FIG. 6 position. At the FIG. 6 position, the sprinkler head configured "A" bar 22 advantageously resides within the interior 51 of the canister 52. Upon introduction of pressurized water through tube 44, thence upwardly through column pipe 31, and thence through coupling member 36 and into the hollow interior of sprinkler head 22, the water 60 emits as jets which impinge upon and wash the interior walls of the canister 50.

A plurality of the sprinkler head water outlet ports 27 are preferably tangentially angled with respect to the head's rotational axis so that the water jets may function as an impeller which rapidly rotates the sprinkler head 22. Resultant orbiting water jets 60 thoroughly sweep over and wash all interior surfaces of the canister 50.

While the rotary sprinkler head canister rinsing progresses, the underlying column pipe 30,36 advantageously dually functions as water conveying means and as a secondary mandrel which upwardly splays floor leaves 58 in the manner depicted in FIG. 6. Thus, such mandrel configured column pipe 30,36 speeds purging of fluids in a manner similar to the floor leaf deflection mandrel function of the overlying sprinkler head 22.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An assembly for dispensing a canister's liquid contents into a vessel and for water rinsing a residue of the liquid contents, the canister having a floor, said assembly comprising:
    (a) an "A" lance having a plurality of legs and having a bar comprising a leaf deflecting mandrel, the leaf deflecting mandrel comprising an enlarged sprinkler head supported by a column having a water conveying bore, said sprinkler head having a plurality of water outlet ports adapting said sprinkler head for water driven rotation, each leg among the plurality of legs comprising a blade having an upper end and an outer edge, the blades' outer edges being sharpened for, upon upward impingement against the canister's floor, segmenting said floor into a plurality of flexible leaf sections;
    (b) first mounting means adapted for positioning the "A" lance within the vessel, and
    (c) second mounting means adapted for rigidly positioning the sprinkler head supporting column the "A" lance's legs, the second mounting means comprising a plurality of braces and a frame interconnecting the legs' lower ends, each brace among the plurality of braces spanning between the sprinkler head supporting column and the frame.

2. The assembly of claim 1 wherein the "A" lance's bar has a lateral end, and wherein said lateral end comprises a plurality of sprinkler head clearance gaps.

3. The assembly of claim 1 wherein the vessel has an upper opening having a lip, wherein the first mounting means comprise a plurality of hooks fixedly attached to and extending upwardly from the ridged frame, and wherein the hooks are adapted for suspending the "A" lance beneath the vessel's upper opening.

* * * * *